United States Patent
Fan et al.

(10) Patent No.: US 8,082,390 B1
(45) Date of Patent: Dec. 20, 2011

(54) TECHNIQUES FOR REPRESENTING AND STORING RAID GROUP CONSISTENCY INFORMATION

(75) Inventors: Qun Fan, Northborough, MA (US); Stephen R. Ives, West Boylston, MA (US); Ran Margalit, Swarthmore, PA (US); Michael J. Scharland, Franklin, MA (US); Zvi Gabriel Benhanokh, Brookline, MA (US); Rong Yu, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 639 days.

(21) Appl. No.: 11/820,574

(22) Filed: Jun. 20, 2007

(51) Int. Cl.
*G06F 12/00* (2006.01)

(52) U.S. Cl. ............... 711/114; 711/141; 711/E12.026
(58) Field of Classification Search ................. None
See application file for complete search history.

(56) References Cited

U.S. PATENT DOCUMENTS

| | | | |
|---|---|---|---|
| 5,206,939 A | | 4/1993 | Yanai et al. |
| 5,778,394 A | | 7/1998 | Galtzur et al. |
| 5,826,001 A | * | 10/1998 | Lubbers et al. ............ 714/6 |
| 5,845,147 A | | 12/1998 | Vishlitzky et al. |
| 5,857,208 A | | 1/1999 | Ofek et al. |
| 6,161,192 A | * | 12/2000 | Lubbers et al. ............ 714/6 |
| 7,523,257 B2 | * | 4/2009 | Horn et al. ............ 711/114 |
| 7,809,898 B1 | * | 10/2010 | Kiselev et al. ............ 711/152 |

OTHER PUBLICATIONS

Blaum, et al. "EVEN-ODD: An Efficient Scheme for Tolerating Double Disk Failures in RAID Architectures", IEEE Transactions on Computers, vol. 44, No. 2, Feb. 1995.
U.S. Appl. No. 11/234,612, filed Sep. 23, 2005, Yochai et al.
U.S. Appl. No. 11/167,704, filed Jun. 27, 2005, Fan et al.

* cited by examiner

*Primary Examiner* — Reginald Bragdon
*Assistant Examiner* — Aracelis Ruiz
(74) *Attorney, Agent, or Firm* — Muirhead and Saturnelli, LLC

(57) ABSTRACT

Described are techniques for representing and using RAID group consistency information. RAID group consistency information for a slice of data included on a device may be obtained by mapping the slice to an index. The index is one of a plurality of indices each associated with a structure indicating RAID group inconsistencies for a different portion of slices of data of the device. If the index is not associated with a structure, it may be determined that there is no RAID group inconsistency for the slice. If the index is associated with a structure, a hint bit associated with the slice may be determined wherein the hint bit encodes summary consistency information for a plurality of slices. A determination is made as to whether the hint bit is set, and, if the hint bit is not set, it is determined that there is no RAID group inconsistency for the slice.

21 Claims, 14 Drawing Sheets

TECHNIQUES FOR REPRESENTING AND STORING RAID GROUP CONSISTENCY INFORMATION

BACKGROUND

1. Technical Field

This application generally relates to data storage, and more particularly to techniques used in connection with consistency information for RAID group members.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Existing data storage systems may utilize different techniques in connection with providing fault tolerant data storage systems, for example, in the event of a data storage device failure. There are a number of different RAID (Redundant Array of Independent or Inexpensive Disks) levels and techniques that may be used in connection with providing a combination of fault tolerance and/or improved performance for data storage devices. For example, RAID-5 techniques can be used in connection with a data storage system to protect from a single device failure with block level striping and distributed parity information, and RAID-6 provides protection from two devices of the RAID group failing with two sets of distributed parity and block level striping.

In connection with RAID device groups, internal consistency information may be maintained regarding the RAID group members. The consistency information may indicate whether a RAID group device has data in an inconsistent or unknown state, such as in the event of a drive failure or replacement. The consistency information may also indicate whether a member including parity data is consistent with respect to the data members. For example, there may be 3 data members or drives and 1 parity member or drive for a RAID group in which a track of parity data is formed from 3 data tracks of the 3 data member drives. Consistency information may be maintained indicating the consistency of the parity data for the 3 data drives. In one existing implementation, consistency information may include a parity consistency bit per track of data indicating whether a track of parity data is consistent with respect to the data tracks of the contributing data drives. The consistency information may be in a track id table which includes an entry for each track of data. The parity consistency information with respect to the 3 data tracks may be replicated in the track id table entries for all 3 data tracks. For example, each of the track id table entries for the 3 data tracks may include a same bit of replicated parity consistency information indicating whether the track of parity data is consistent with respect to the 3 data tracks. The foregoing replication of parity consistency data for a RAID group creates an inefficiency in connection with maintaining and updating the consistency information. Additionally, storing internal consistency information regarding the RAID group in the track id table exposes internal RAID management information to other processes, such as other applications, that may also use the track id table. The other processes may improperly modify the consistency information introducing problems for management of the RAID group.

SUMMARY OF THE INVENTION

In accordance with one aspect of the invention is a method for obtaining RAID group consistency information for a slice of data included on a device comprising: mapping the slice to an index, the index being one of a plurality of indices each associated with a structure indicating RAID group inconsistencies for a different portion of slices of data of the device; if the index is not associated with a structure, determining that there is no RAID group inconsistency for the slice; if the index is associated with a structure, performing: determining a hint bit associated with the slice, wherein the hint bit encodes summary consistency information for a plurality of slices, said hint bit being set if there is a RAID group inconsistency for any of the plurality of slices; determining whether the hint bit is set; and if the hint bit is not set, determining that there is no RAID group inconsistency for the slice. The method may also include retrieving RAID group consistency information from the structure for the slice if the index is associated with a structure and if the hint bit is set. The structure may contain RAID group consistency information for a portion of slices forming a plurality of slice groups, each of said plurality of slice groups including a same number of slices from said portion. The retrieving may further comprise: determining which first slice group of the plurality of slice groups includes said slice; determining an offset in said structure for said first slice group, said offset indicating where in said structure RAID group consistency information is stored for said first slice group; determining a location relative to said offset at which RAID group consistency information is stored for said slice; and retrieving RAID group consistency information for said slice from said location. The RAID group consistency information for said slice may include a bit associated with each member device of a RAID group. Each member device may store data or parity information. A bit associated with said each member device may be set if said each member device contains inconsistent data for said slice. The structure may be stored in a cache slot.

In accordance with another aspect of the invention is a method for updating RAID group consistency information for a slice of data included on a device comprising: mapping the slice to an index, the index being one of a plurality of indices each associated with a different portion of slices of data of the device; determining whether the index is associated with a structure; if the index is not associated with said structure, allocating storage for the structure and associating the structure with the index, said structure indicating RAID group inconsistencies for a first portion of slices of data of the device, the first portion including the slice; determining a location in said structure at which RAID group consistency information for said slice is stored; and determining a value for a hint bit encoding summary consistency information for a plurality of slices including said slice, said hint bit being set if there is a RAID group inconsistency for any of the plurality of slices. The method may also include determining one or more hint bits encoding summary consistency information for the first portion of slices; and determining whether the one or more hint bits indicate that there are no inconsistencies for the first portion of slices. If the one or more hint bits indicate that there are no inconsistencies, the method may further comprise deallocating storage for the structure. The step of allocating storage for said structure may include obtaining a cache slot used to store said structure. The step of deallocating storage for the structure may include returning a cache slot including said structure to a cache pool.

In accordance with another aspect of the invention is a data structure included in a computer readable memory for storing RAID group consistency information for a device including slices of data, the data structure comprising: a first field of one or more indices, each of said indices being associated with a different portion of said slices, each of said indices being associated with a second data structure indicating RAID group inconsistencies for a portion of slices associated with said each index; a second field including one or more hint bits, each of said hint bits encoding summary consistency information for a different one or more of said slices, said hint bit being set if there is a RAID group inconsistency for any of said one or more slices; and wherein the second data structure includes RAID group consistency information for each slice included in the portion. The RAID group consistency information for each slice may include a bit for each member device of a RAID group. Each member device may store data or parity information. A bit associated with said each member device may be set if said each member device contains inconsistent data for said each slice. The second data structure may be stored in a cache slot. The device may be a logical device and the first data structure may be included in a header of a device table for the logical device. Each of the indices may be null if there are no RAID group inconsistencies for a portion of slices associated with said each index.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
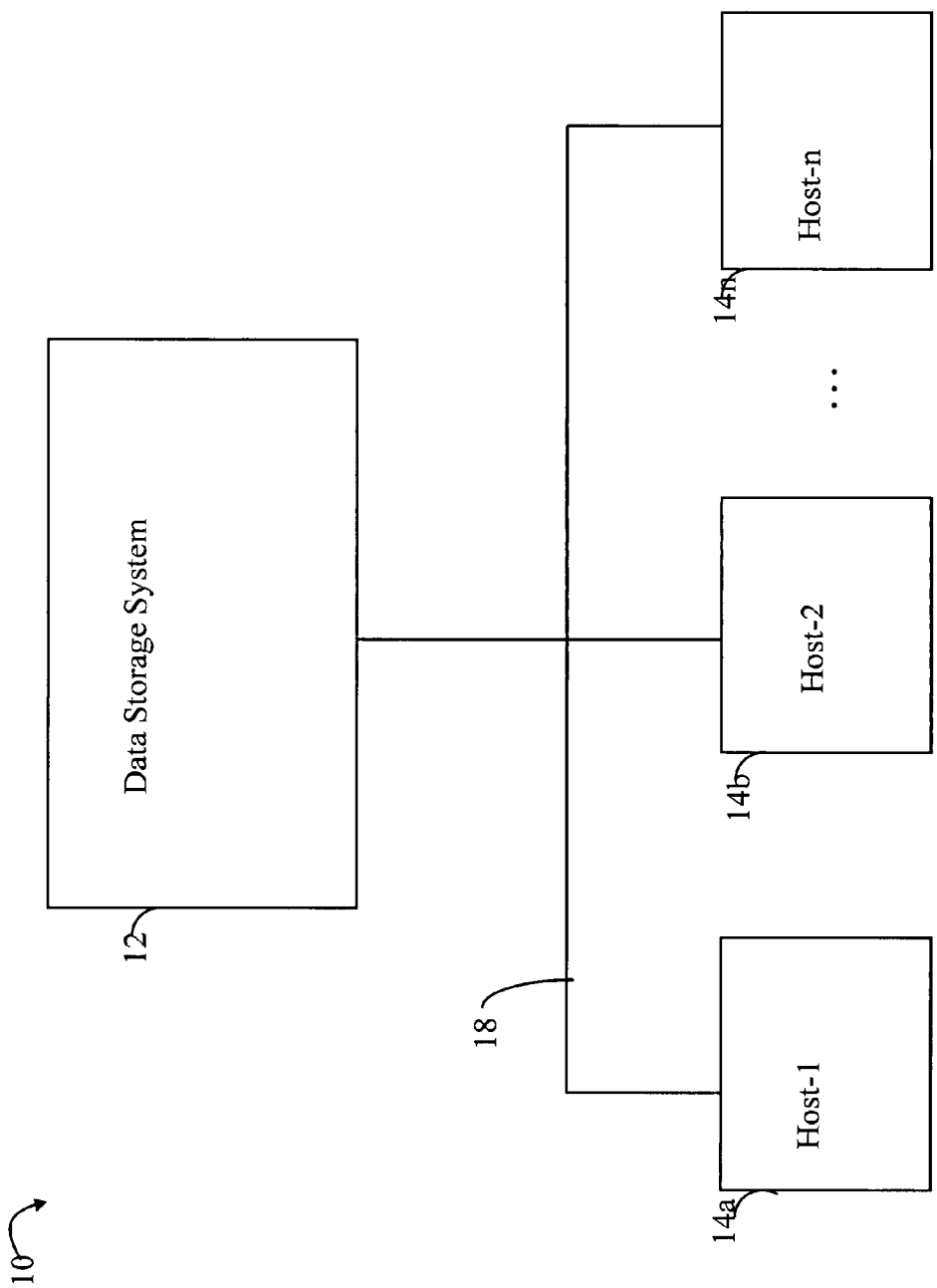
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14*a*-14*n* through communication medium 18. In this embodiment of the computer system 10, and the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/ or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage system 12, and may also communicate with others included in the computer system 10.

Each of the host systems 14*a*-14*n* and the data storage system 12 included in the computer system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14*a*-14*n* and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
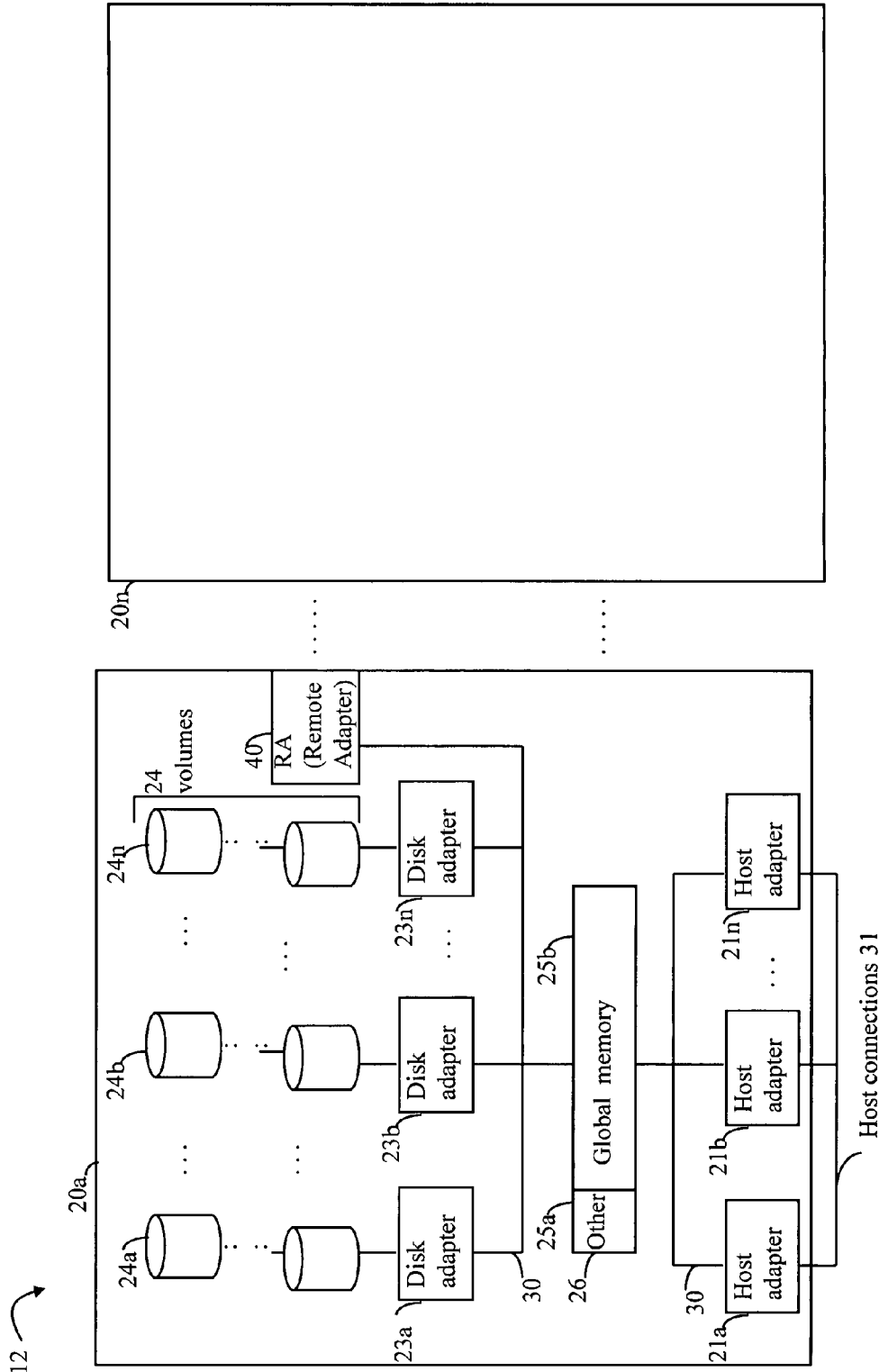
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
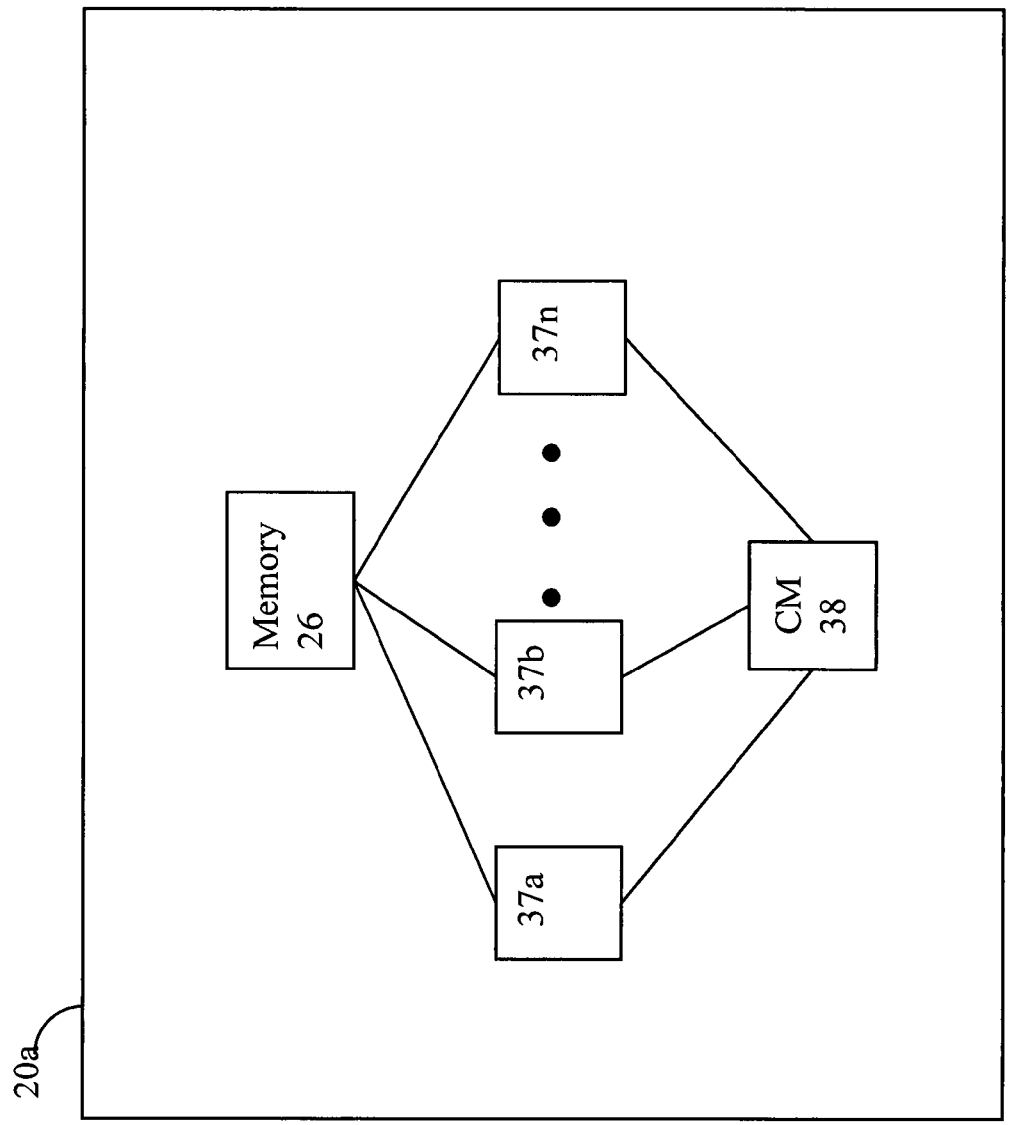
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As known to those of ordinary skill in the art, different techniques may be used in connection with providing fault tolerant data storage systems. There are a number of different RAID (Redundant Array of Independent or Inexpensive Disks) levels that may be used in connection with providing a combination of fault tolerance and/or improved performance for data storage devices. Different RAID levels (e.g., RAID-1, RAID-5, RAID-6, and the like) may provide varying degrees of fault tolerance. For example, RAID-5 techniques may be used in connection with providing protection in the event of a single device failure within a RAID group. Information is stored in connection with a RAID-5 implementation which allows a data storage system to rebuild or recover the data on the single failed device within a RAID group. However, RAID-5 techniques do not provide protection for two independent devices failures within a RAID group, as may occur, for example, in the event of a second device failure during a rebuild/recovery phase of a first failed device. RAID-6 techniques may be used in a data storage system to provide for such data protection in the event of two independent device failures in a device grouping, such as within a single data storage array.

In connection with RAID groups of devices such as disk drives, consistency information may be maintained regarding the internal consistency of the RAID group members. The consistency information may include consistency information with respect to the data members and parity members. Data member consistency information may indicate whether data on a member device or drive is consistent. Parity member consistency information indicates whether data of the parity member is in a consistent state. For example, in the event of a drive failure or replacement of an existing drive (parity and data members), data of the affected device is indicated as being in an inconsistent state by the consistency information. A data inconsistency may also exist if the parity information does not appropriately reflect the parity with respect to the contributing data members. For example, there may be 3 data members or drives and 1 parity member or drive for a RAID group in which a track of parity data is formed from 3 data tracks of the 3 data member drives. An inconsistency may be determined if the parity information does not properly reflect the parity of the contributing data members.

The foregoing are just some examples of RAID group inconsistencies that may be reflected in the RAID group consistency information. What will be described in following paragraphs are techniques for representing and storing the consistency information for a RAID group. It should be noted that the techniques herein may be used in connection with varying RAID levels such as RAID-1 protection with mirroring, as well as for RAID techniques having one or more parity members such as for, example, with implementations of RAID-2 and higher. For purposes of illustration, a particular configuration and number of data and parity members may be described. However, it will be appreciated by those skilled in the art that the techniques herein should be construed as limited to these examples.

What will be described in following paragraphs are techniques that may be used in connection with an embodiment utilizing RAID-6. The techniques use a double parity scheme. For N data devices or drives, two parity devices are used. A first parity drive, referred to as the horizontal parity drive, and a second parity drive, referred to as a diagonal parity drive, are utilized in connection with a data unit grouping of size N−1 to encode parity information thereon of the N data drives. Parity information may be determined utilizing the XOR (exclusive-OR) logical operation. However, it should be noted that the parity information utilized in connection with the techniques described herein may be determined using other operations and processing steps as known to those of ordinary skill in the art. XOR may be selected in an embodiment because, for example, due to the efficiency of performing such an operation. The values associated with the XOR logical operation of the contributing data members are used in determining the correct parity values.

Figure 3:
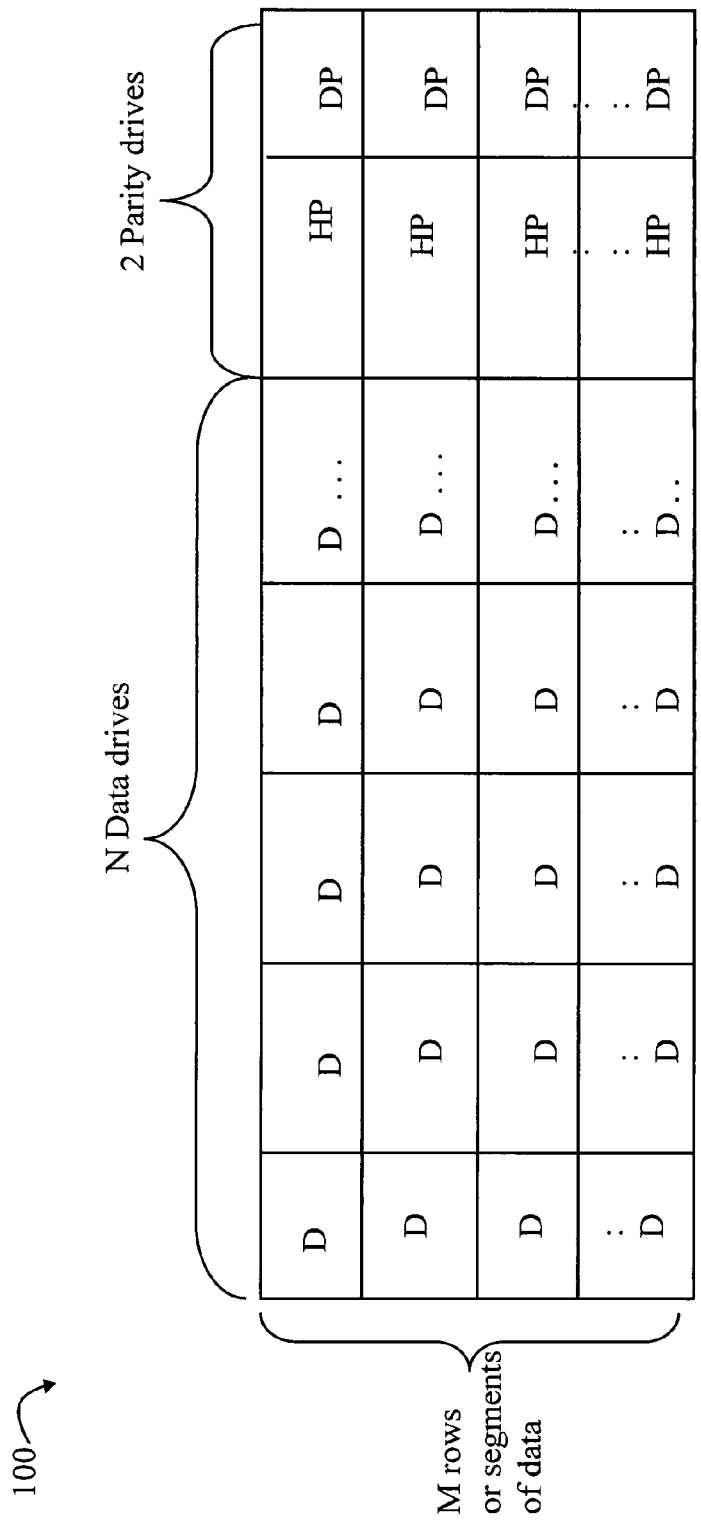
FIG. 3 is an example representation of data stored on member drives of a RAID group.

Referring to FIG. 3, shown is an illustration 100 of the data segments of each data drive and the horizontal and diagonal parity drives as may be used in connection with the techniques described herein. It should be noted that the particular values used herein for sizes, dimensions, and the like, are selected for the purposes of example and illustration and should not be construed as a limitation of the techniques. The example 100 includes N data drives. Each data drive is represented as a column of M data segments. Each data segment corresponds to an element within a particular column. The example 100 also includes 2 parity drives denoting horizontal parity (HP) segments and N diagonal parity (DP) segments. The particular relationships between data segments (represented as "D" segments or elements in 100) and DP and HP segments may vary with each particular RAID implementation using the techniques herein. For example, an embodiment may use a RAID-6 technique as described in U.S. patent application Ser. No. 11/167,704, filed Jun. 27, 2005, Fan, et al., TECHNIQUES FOR FAULT TOLERANT DATA STORAGE, which is incorporated by reference herein, or the technique described in "EVEN-ODD: An Efficient Scheme for Tolerating Double Disk Failures in RAID Architectures", IEEE Transactions on Computers, Vol. 44, No. 2, February 1995, by Blaum et al., as well as other techniques for RAID-6 and other RAID levels known in the art.

For purposes of illustration, an exemplary configuration may be a RAID-6 implementation having 6 data members and 2 parity members.

It should be noted that each cell or element in the arrangements described herein, for example, as in connection with FIG. 3, may correspond to a symbol of information. The size of a symbol in an embodiment may vary. For purposes of illustration and example, the size may be a single bit. However, the actual symbol size utilized in an embodiment may vary. For example, in one embodiment in which a column of the arrangement corresponds to a stand alone physical storage device such as a disk, a symbol may correspond to data on a single disk sector or other data partitioning scheme that may be used in an embodiment.

As known in the art, the data segments denoted as D in the example 100 may represent data of a logical device or volume (e.g., LV) that is striped or distributed across RAID group data members. Each data segment D and each segment of parity information (denoted HP and DP) may further include one or more "slices". Each slice may correspond to a track or some other partitioned unit of storage. For purposes of illustration in this example, a slice may correspond to a track of data.

In one embodiment, consistency information may be stored per LV in tables in global memory of the data storage system. The tables store metadata about the LVs residing thereon.

Figure 4:
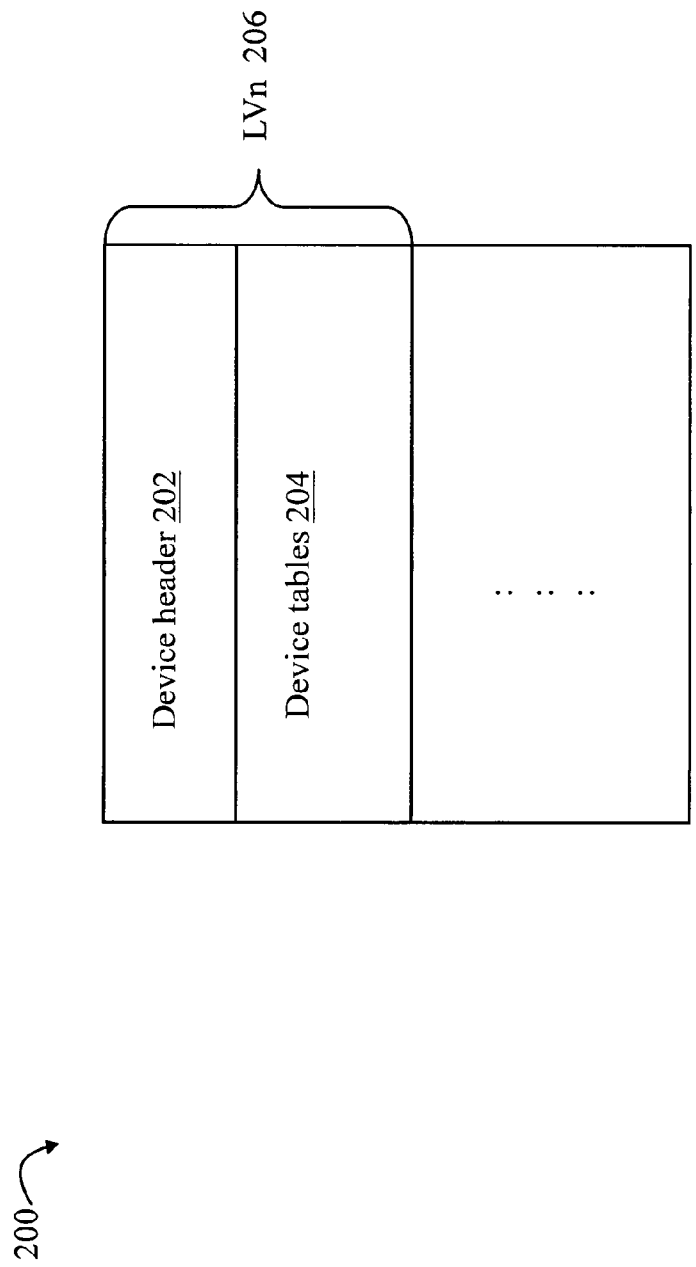
FIGS. 4-6 are example representations of data structures used in connection with representing RAID group consistency information.

Referring to FIG. 4, shown is an example representation of a logical volume (LV) table stored in global memory. The table 200 includes metadata about each LV in the data storage system. In the example 200, the table includes portion 206 for each LV. Each portion 206 includes a device header 202 and device tables 204. The device header 202 includes a consistency table used in connection with storing the consistency information for an LV described by 206. Device tables 204 include the track id table describing information about each physical track of the LV. The device header 202 with consistency table as well as the track id table included in section 204 are described in more detail in following paragraphs. It should be noted that an embodiment may store additional information about each LV than as described herein.

Figure 5:
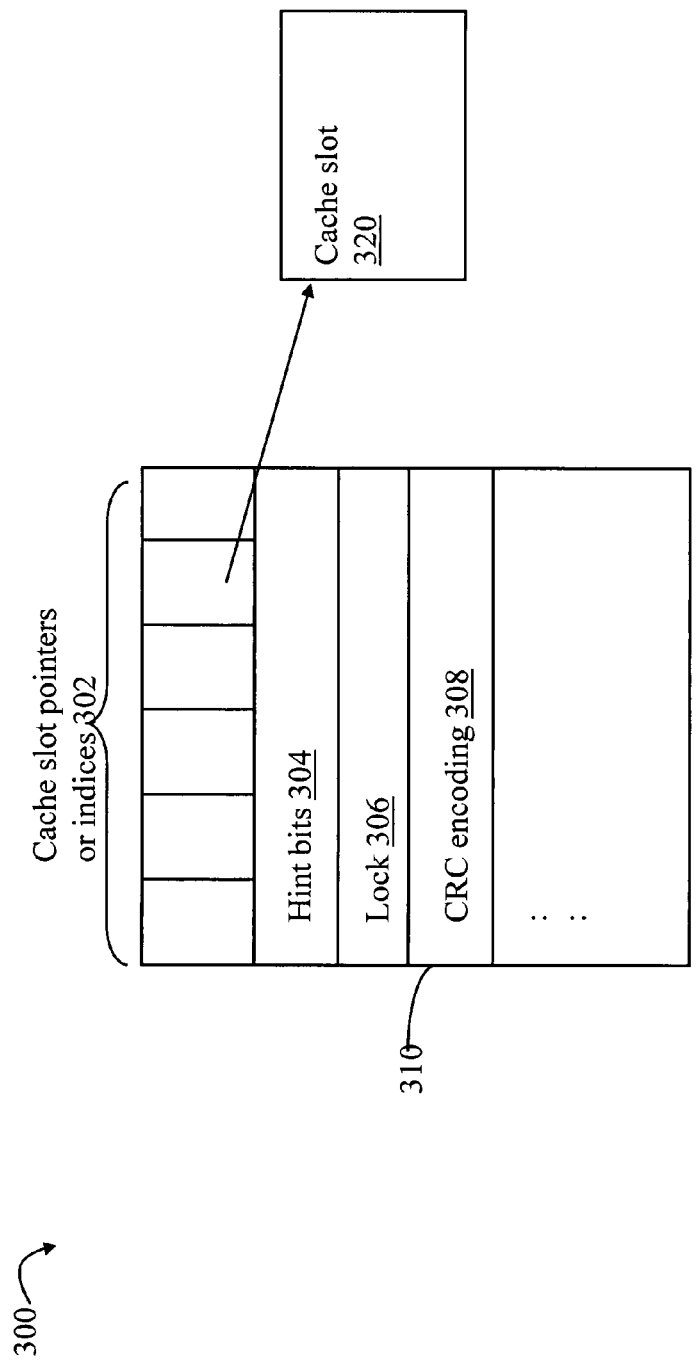

Referring to FIG. 5, shown is a representation of structures that may be used to store the consistency information for an LV. The example 300 includes a consistency table 310 that may be included in the device header 202 of FIG. 3. The consistency table 310 includes cache slot pointers or indices 302, hint bits 304, a lock 306, CRC encoding 308, and optionally other information. The cache slot pointers 302 identify cache slots, such as 320, storing consistency bit maps for a portion or range of slices included of the LV. It should be noted that although "pointers" are used in connection with element 302, element 302 may be more generally referred to as cache slot references referring to or otherwise identifying an associated cache slot structure described and used in following paragraphs for storing consistency information for slices. As another example, element 302 may be implemented as an array of pointers each associated with an index representing the position of an array element or cell within the array.

In one embodiment, the consistency table 310 may include 6 cache slot pointer locations in 302. Thus, the total range or number of slices in the LV may be divided into 6 partitions, each of the 6 partitions being mapped to a portion of the total range of slices. The first cache slot pointer may identify a cache slot containing consistency bit map information for a first range or portion of slices for the LV, the second cache slot pointer may identify a cache slot containing consistency bit map information for a second range or portion of slices of the LV, and so on. The cache slots used in connection with 302 may be dynamically allocated from a cache slot pool for caching used in the data storage system. Each cache slot may be allocated as needed to represent inconsistencies. In the event there are no inconsistencies for slices in a range or portion of slices associated with a cache slot pointer, there is no cache slot allocated and used with the cache slot pointer. In other words, if there are no RAID group inconsistencies for the slices in the LV, all cache pointers in 302 are null and no cache slots are allocated for use. Cache slots are allocated for use with the table 310 as inconsistencies occur. When the inconsistency is removed, for example, by successful completion of rebuild operation to rebuild data of one or more RAID group members, the cache slot may be deallocated for use with the table 310 and returned to the pool of cache slots for reuse.

Each cache slot allocated for use with the techniques herein may be marked as appropriate for the particular caching implementation so that the cache slot is not evicted from the cache when in use with the techniques herein. The information of the table 310 and any associated cache slots such as 320 may be persistently stored using any one of a variety of techniques known in the art.

The hint bits 304 encode summary consistency information for a group of slices included in the LV. The total range or number of slices in the LV may be partitioned so that a different portion of the total range of slices is mapped to a single hint bit. The hint bit may be set (e.g., =1) if there exists an inconsistency for any slice in the range portion associated with the hint bit. Otherwise, the hint bit may be cleared (e.g., =0). In other words, the hint bit is set if any slice in the range is inconsistently stored on any data member or if any parity information regarding the slice is inconsistent. The purpose of the hint bit is to provide summary information for a number of slices of the LV to possibly avoid a more expensive look up process to access detailed information about the slice in the cache slot. When determining whether there is any inconsistency for a slice, a first examination of the hint bit mapped to the slice is made. If the hint bit is not set, then a determination is made that there is no inconsistency for this slice, as well as any other slice, within the range mapped to the hint bit. If the hint bit is set, then additional processing is performed to obtain any inconsistency information for the slice from the correct cache slot. In this way, an initial determination can be made regarding whether there is any RAID group inconsistency for the slice without incurring the additional overhead associated with accessing the more detailed consistency bitmap information stored in cache slots. The hint bits may be characterized as a performance optimization used in a hierarchical approach when reading consistency information for the RAID group to try and avoid subsequent, costly, processing incurring additional overhead.

Additional information regarding the data represented in the cache slot and hint bit is described in more detail in following paragraphs.

The lock 306 may be used to synchronize access to the information in the LV header 202 using any one of a variety of different techniques known in the art. The lock may be used, for example, to synchronize access to the header 202 by two DAs. The lock 306 may be used to avoid having two DAs updating (e.g., writing) to the portion 310 or associated cache slots 320. In one embodiment, the state of the lock 306 may be updated using the "compare and swap" (CAS) operation or primitive which atomically compares the contents of a memory location to a given value and, if they are the same, modifies the contents of that memory location to a given new value. The result of the CAS operation indicates whether the substitution or swap has been performed. Other embodiments may use other techniques depending on the primitives available.

The CRC encoding 308 may include CRC (cyclic redundancy check) information for the data in 310. The use of CRCs is known in the art and may be characterized as a signature of the data in 310 used to verify the integrity of the data in 310. Any one of a variety of different techniques may be used to determine a CRC corresponding to data. A first CRC may be determined and stored in 308. At a later point in time when reading data from 310, a second CRC may be determined based on the current contents of 310. If the first stored CRC does not match the second calculated CRC, the data of 310 has been changed or possibly corrupted.

An embodiment may optionally not include the hint bits and may otherwise include the consistency information encoded in the cache slots. In such an embodiment, each device header as represented in FIG. 5 may omit the hint bits 304.

It should be noted that in FIG. 5, a single cache slot is shown as associated with the fifth element of 302 (1-based array access). In this illustration, there is consistency information representing an inconsistency for one or more slices associated with the fifth cache slot 320. At different points in time, there may be no cache slots (e.g., no inconsistencies for the LV), as well as more than one cache slot depending on the particular RAID group inconsistencies.

Figure 6:
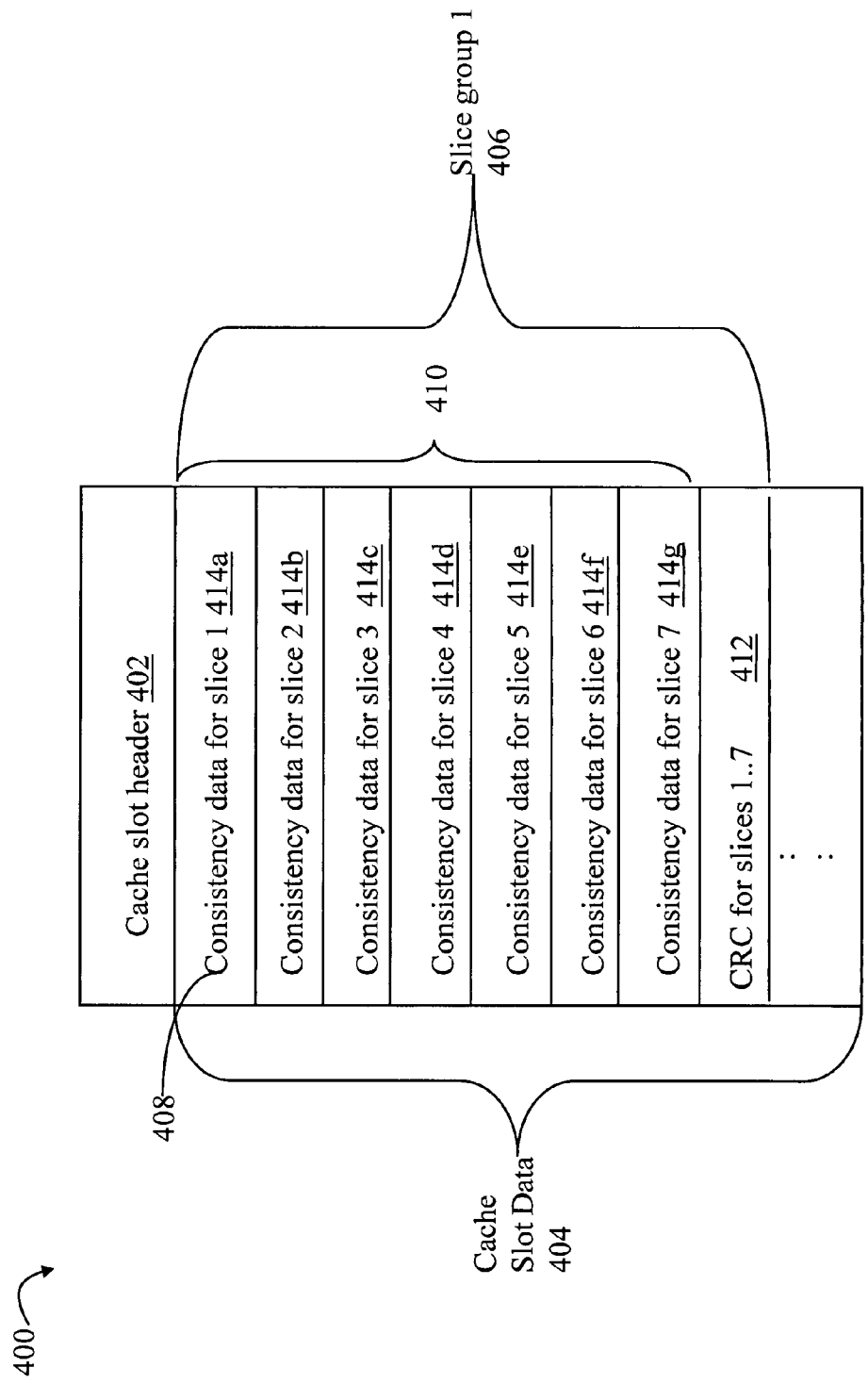

Referring to FIG. 6, shown is a more detailed representation of information included in each cache slot used in connection with techniques herein. The example 400 provides additional detail regarding the data layout or formatting of a cache slot, such as cache slot 320 of FIG. 5. The cache slot in the example 400 includes a cache slot header 402 and cache slot data 404. The cache slot header 402 may include information used in connection with cache maintenance and operation that varies with each embodiment. The cache slot data portion 404 includes consistency bit map information for multiple slice groups each having a corresponding slice group data portion 406. A slice group includes one or more slices within the range of slices associated with the cache slot. For example, if a cache slot is mapped to a slice range of 16 slices, the 16 slices are further partitioned into slice groups each having a slice group data portion 406. The slice group data portion 406 includes consistency bit map information 410 for the slice group and CRC information 412 for the consistency bit map information 410. The consistency bit map information 410 encodes consistency information of the RAID group members for each slice in the associated slice group. In one embodiment, each slice group may include 7 slices. Each of the slices has a corresponding entry 414a-414g in area 410.

It should be noted that as described herein, the CRC values of field 412 of FIG. 6 as well as field 308 of FIG. 5 are used in connection with processing to ensure data integrity. It will be appreciated by those skilled in the art that other techniques may be used in forming values for these fields for use in ensuring data integrity. For example, an embodiment may form values used in connection with field 412 of FIG. 6 and field 308 of FIG. 5 to ensure data integrity by logically XOR-ing the data being protected.

Figure 6A:
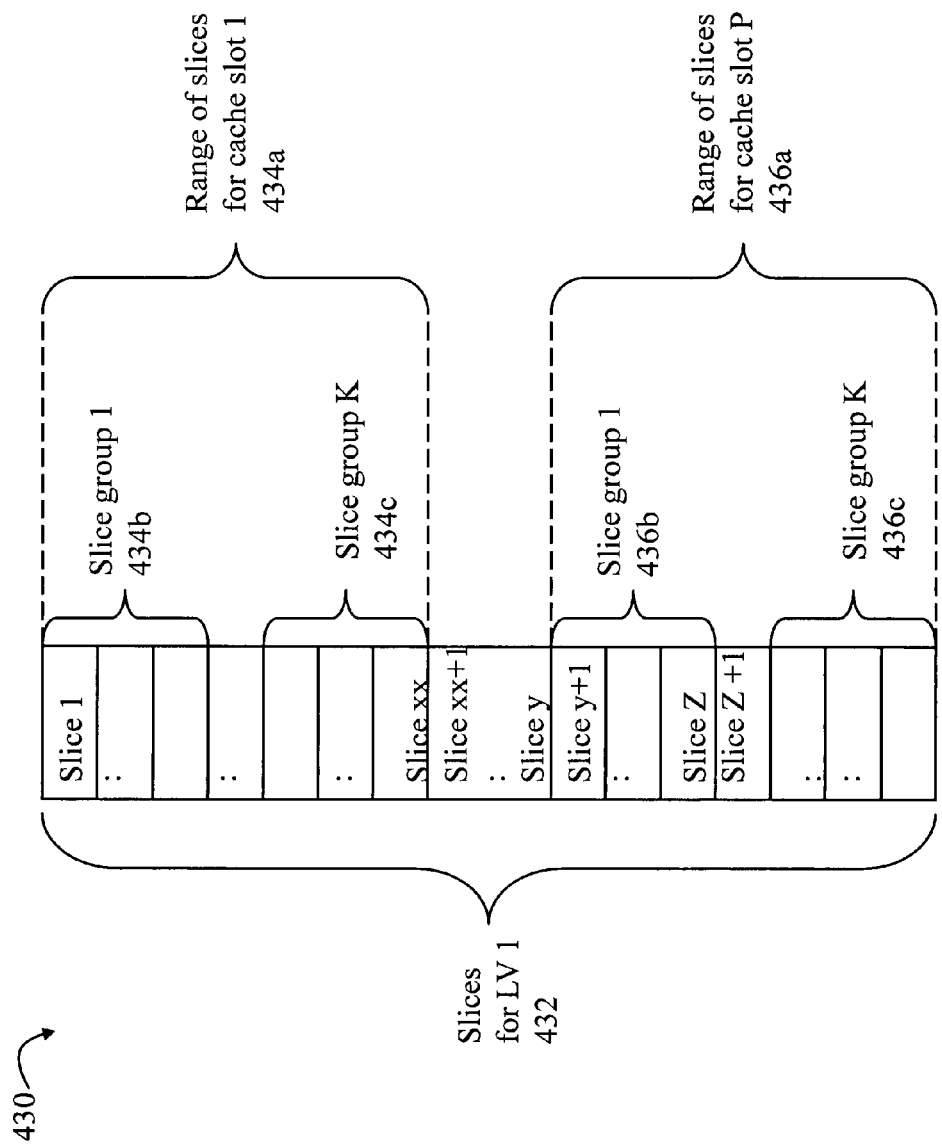
FIG. 6A is an example illustrating the partitioning of slices of a device into slice groups and associating slices with cache slots.

Referring now to FIG. 6A, shown is an illustration of the mappings associated with each LV, such as LV1, as described herein. In the example 430, LV1 may include a number of slices 432. Each slice may correspond to a portion of a physical data storage device such as a track of data. The range of slices in 432 is first divided into P partitions where P is the number of cache slot pointers included in field 302 of FIG. 5. Each of the P partitions corresponds to a different range of slices for LV1 so that a given slice may be mapped to a cache slot identified by one of the cache slot pointers containing the slice's consistency information. Each range of slices associated with a cache slot, such as represented by elements 434a and 436a, is further partitioned into K slice groups. The range of slices for cache slot 1 434a is divided into K slice groups denoted 434b-434c. As a further example with reference back to FIG. 6, consider cache slot 1 434a. Each of the K slice groups, such as 434b, has a corresponding slice group data portion 406.

It should be noted that the range or portion of slices associated with a each cache slot is generally much larger than a range of portion of slices associated with each hint bit. Thus, the encoding of summary information for a cache slot may be represented by multiple hint bits.

Figure 7:
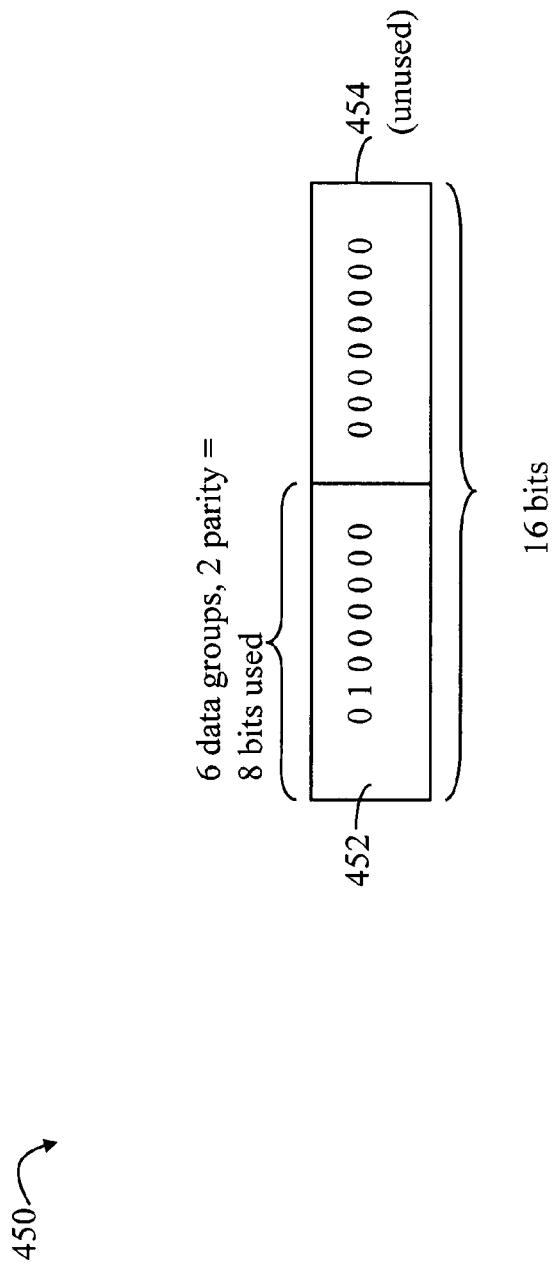
FIG. 7 is an example representation of consistency information in the form of a consistency bitmap for a slice of data.

Referring to FIG. 7, shown is an example representation of how the consistency information of each slice is encoded. The example 450 represents the information encoded in an entry such as 408 of portion 410 of FIG. 6. Each entry of consistency data for a slice may be a fixed size in the form of a bitmap. In one embodiment, the consistency information for each slice may be 16 bits with a bit for each member or device in the RAID group. For example, if an embodiment has 6 data members and 2 parity members in a RAID group, 8 bits of the 16 bit entry 450 are used. If there are unused bits of the entry 450 as in this case where there are more bits that RAID group members, the unused bits are expected to be 0. As an example of a data inconsistency occurrence, data member or drive 1 fails and may be replaced. The consistency information for all slices stored on drive 1 is appropriately set to indicate the data inconsistency due to drive 1's failure and replacement so that a data rebuild or reconstruction may occur for drive 1. In this instance, the bit corresponding to drive 1 in each slice stored on drive 1 is set to indicate the data inconsistency until cleared or made consistent upon completion of the data reconstruction. Using a zero-based drive numbering of 0..7 for each drive or data member of the RAID group, element 452 represents the consistency information that may be stored for each slice's consistency information upon the failure of drive 1 as described above. Element 454 may represent the unused remaining bits of the entry 450 in this example.

It should be noted that an entry 450 used to encode the consistency information for a slice may vary in size from that as illustrated herein. For example, the size of the entry 450 may be 8 bits rather than 16 bits so that there are no unused bits of the entry with 8 RAID group members. An embodiment may select a size of each entry encoding the consistency information for a slice in accordance with a maximum number of possible RAID group members.

Figure 8:
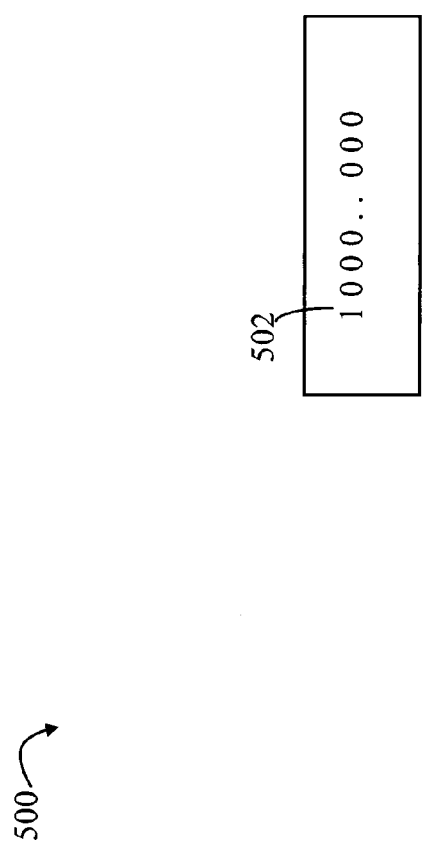
FIG. 8 is an example representation of summary consistency information that may be encoded using hint bits.

Referring to FIG. 8, shown is an example representation of summary consistency information that may be encoded using hint bits. The hint bits of the example 500 are included in each cache slot as illustrated in element 340 of FIG. 5. Each hint bit corresponds to a different range of slice groups for the LV. If any one slice group in the range has a slice which is inconsistent on any RAID group members, the hint bit is set (e.g., =1). Otherwise, the hint bit is clear (e.g., =0). In one embodiment, each hint bit may correspond to 64 slice groups. If any one slice in any of the corresponding 64 slice groups for a hint bit has a data inconsistency, the hint bit is set. When the hint bit is set, it signifies that there is additional consistency information stored within a cache slot for the one or more slices having the inconsistencies. If there are no inconsistencies for the LV, all hint bits associated with slices for the LV are zero and all cache slot pointers are null since there is no inconsistency information to be stored. With reference to the previous example described in connection with FIG. 7 with drive 1 failure, consistency information for all slices stored on drive 1 each have the appropriate bit set to indicate the drive 1 inconsistency. If one or more of the slices stored on drive 1 are included in a slice group associated with the hint bit 502, the hint bit 502 is set.

As described elsewhere herein, the hint bits may be used as a performance optimization when retrieving consistency information. As an example use, a host may issue a read request and a RAID group member drive 1 has failed. Upon replacement of the failed drive 1, consistency information for each of the data slices stored on the failed drive 1 is initially set to indicate that data member 1 is inconsistent. A rebuild operation may be commenced and in progress to rebuild the data for the failed drive 1 using data and/or parity information from the other RAID group drives when the host read request is received. In connection with servicing the host read request, processing may be performed to determine if the requested data is currently inconsistent. A check for the slice (s) associated with the read request is performed by reading the consistency information for the slice(s). If there are no inconsistencies for the slices of the read request, then the read request can be serviced without first rebuilding any RAID group members storing the slices related to the read request. An initial determination as to whether there is any RAID group inconsistency for each of the slices may be performed using the hint bits. If any hint bit indicates an inconsistency for one of the slices, additional processing may be performed to obtain the slice-level RAID group consistency information included in corresponding cache slots. The hint bits may be used as a short cut to try and avoid the more costly additional processing to access the slice-level RAID group consistency information.

Figure 9:
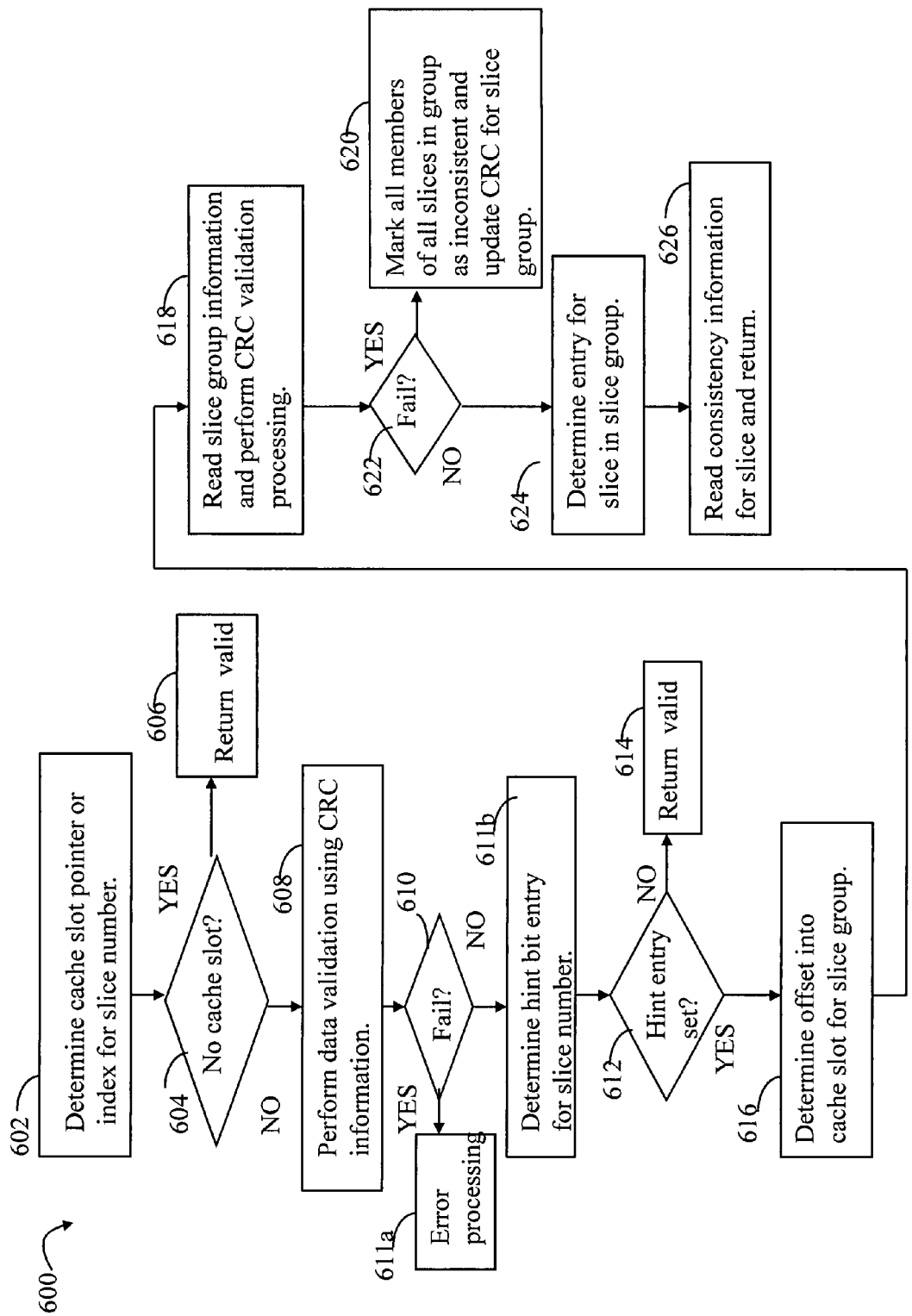
FIG. 9 is a flowchart of processing steps that may be performed when reading or retrieving consistency information for a slice of data.

Referring to FIG. 9, shown is a flowchart of processing steps that may be performed in an embodiment using the techniques herein for reading consistency information for a slice. The processing of flowchart 600 uses the structures as described and illustrated above. It should be noted that flowchart 600 does not explicitly set forth processing that may occur in connection with synchronization of the shared structures. However, it will be appreciated by those skilled in the art that access to the consistency information and other data of the LV header may be synchronized using a variety of different techniques as described herein and also known in the art. At step 602, the cache slot index or pointer for the slice number of interest is determined. In this example, the slice number may be one slice of an LV. The range of slices of the LV is partitioned into a number of portions each having different portion of the total range of slices for the LV. The given slice number of an LV in step 602 is mapped to one of the portions of the slice number range to determine the appropriate cache slot pointer. At step 604, a determination is made as to whether there is a cache slot associated with the current cache slot pointer from step 602. Step 604 may examine the cache slot pointer to determine if there is no associated cache slot (e.g., the pointer is NULL). If step 604 evaluates to yes, control proceeds to step 606 to return an indication that there is no RAID group inconsistency for the current slice number. As described above, cache slots may be allocated only when there is an inconsistency. Thus, the existence of no cache slot as determined by step 604 implies that there is no inconsistency for the slices associated with the slice numbers for the cache slot pointer or index of step 602.

If step 604 evaluates to no, control proceeds to step 608 to perform additional processing. Step 608 performs data validation using the CRC information of the device header field 304 of FIG. 5. A determination is made as to whether the data validation failed. If so, control proceeds to step 611*a* to perform error processing since the metadata associated with this LV may have been corrupted. If step 610 evaluates to no, control proceeds to step 611*b* to determine the hint bit corresponding to the slice number. As part of step 610 processing, a slice group for the corresponding slice may be determined and then the appropriate hint bit for that slice group determined. A determination is made at step 612 as to whether the hint bit entry is set. If not, it means that no slice associated with the hint bit has a RAID group inconsistency and control proceeds to step 614 to return an indication of validity or consistency for the slice number. If step 612 evaluates to yes, control proceeds to step 616 to commence processing to determine if the slice number has a RAID group inconsistency by accessing the slice-level consistency bit map.

At step 616, the offset into the cache slot data portion is determined for the slice group containing the slice number. The offset may be determined based on a first offset into the cache slot data portion for the slice group containing the slice number. At step 618, with reference to FIG. 6, the slice group information 406 for all slices may be read. The information includes the consistency information 410 for the slices along with the CRC information 412 for this slice group. Validation processing may be performed using the CRC information 412 for the slice group and the slice group consistency information 410 to determine if the stored CRC information matches calculated CRC information based on the current contents of 410. A determination is made at step 622 as to whether the CRC validation processing has failed. If so, control proceeds to step 620 to mark all members or drives of all slices in the RAID group as inconsistent, and then update the CRC for the slice group. Step 620 may include setting, for each slice in the slice group, the corresponding entry in 410 to indicate that all RAID group members are inconsistent. Step 620 may also include resetting the stored CRC value of 412 to be that as currently calculated based on the currently stored slice group consistency information of 410. Marking the members as inconsistent in 620 may trigger a subsequent attempt to rebuild the slices stored on data members marked as inconsistent within the bitmaps for those slices.

If step 622 evaluates to no, control proceeds to step 624 to determine the entry for the slice containing the per-slice consistency bit map within the slice group consistency information. Step 624 includes determining the location within portion 410 for the slice number of interest within the slice group. At step 626, the consistency information (e.g., consistency bit map as represented in FIG. 7) for the slice number is retrieved and returned.

Figure 10:
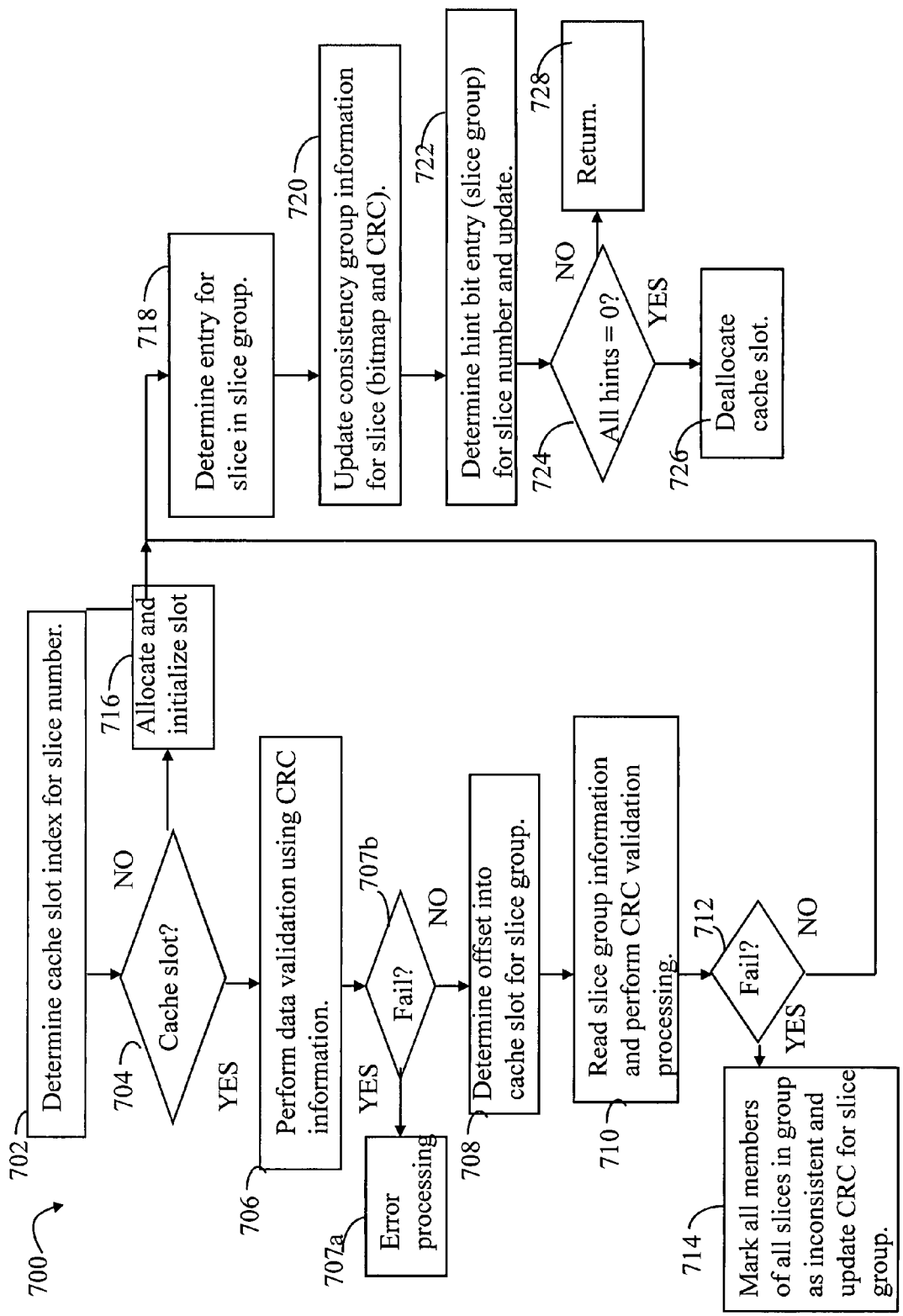
FIG. 10 is a flowchart of processing steps that may be performed when updating consistency information for a slice of data.

Referring to FIG. 10, shown is a flowchart of processing steps that may be performed in an embodiment using the techniques herein for writing or updating consistency information for a slice. The processing of flowchart 700 uses the structures as described and illustrated above. It should be noted that flowchart 700 does not explicitly set forth processing that may occur in connection with synchronization of the shared structures. However, it will be appreciated by those skilled in the art that access to the consistency information and other data of the LV header may be synchronized using a variety of different techniques as described herein and also known in the art.

At step 702, the cache slot pointer or index for the slice number of interest is determined. Step 702 processing is similar to step 602 processing of FIG. 9. At step 704, a determination is made as to whether there is a cache slot associated with the current pointer or index. Step 704 processing is similar to step 604 of FIG. 9. If step 704 evaluates to no, control proceeds to step 716 to allocate a cache slot and perform any initialization of the cache slot. Step 716 may include any initialization to assure that the cache slot is not evicted from cache. Step 716 may also include other initialization processing such as, for example, initializing all data members of consistency bit maps represented as 450 of FIG. 7 to indicate all members are consistent. Control proceeds to step 718 to determine the appropriate location in the newly allocated cache slot to be updated for the current slice number. Step 718 processing is similar to step 624 of FIG. 9. At step 720, the consistency information for the slice is updated. Step 720 may include updating the consistency bitmap for the slice (e.g., appropriate one of 414*a*-414*g*) and also updating the CRC for the slice group (e.g., element 412 of FIG. 6). At step 722, the hint bit entry associated with the slice group is also accordingly updated. Step 722 processing may include retrieving the consistency bitmap information for slices contributing to the hint bit entry, and setting the hint bit to 1 if any of the contributing slices has an inconsistency. Otherwise, the hint bit is set to 0. At step 724, a determination is made as to whether all hint bits associated with the current cache slot index or pointer from step 702 are zero. If not, control proceeds to step 728 to return and continue with subsequent processing. Otherwise, control proceeds to step 726 to deallocate the cache slot and initialize the pointer or index of step 702 to be null. As part of the deallocation of step 726, the cache slot may be returned to the pool of cache slots which may be used for subsequent processing.

If step 704 evaluates to yes, control proceeds to step 706 to perform data validation using the CRC information. At step 707*b*, a determination is made as to whether data validation processing using the CRC information has failed. If so, control proceeds to step 707*a*. Otherwise control proceeds to step 707*b*. Steps 706, 707*b* and 707*a* are similar, respectively, to steps 608, 610 and 611*a* of FIG. 9.

At step 708, the offset into the cache slot for the slice group containing the current slice number of interest is determined. At step 710, the slice group information for the slice group containing the current slice is read and CRC validation processing is performed. At step 712, a determination is made as to whether the CRC validation processing failed. If not, control proceeds to step 718 processing as described above. Otherwise, if step 712 evaluates to yes, control proceeds to step 714 to mark all RAID group members of all slices in the slice group as inconsistent. The CRC information for the slice group is also updated in accordance with the current contents of the consistency bitmaps for the slice group. Steps 708, 710, 712, and 714 are respectively similar to step 616, 618, 622, and 620 of FIG. 9.

It should be noted that an embodiment may also optionally omit the hint bits 304 of FIG. 5 and store consistency information for the RAID group for each slice as otherwise represented in FIGS. 5-7. It will be appreciated by those skilled in the art that the steps of FIGS. 9 and 10 related to the hint bit usage may be accordingly omitted in such an embodiment.

Figure 11:
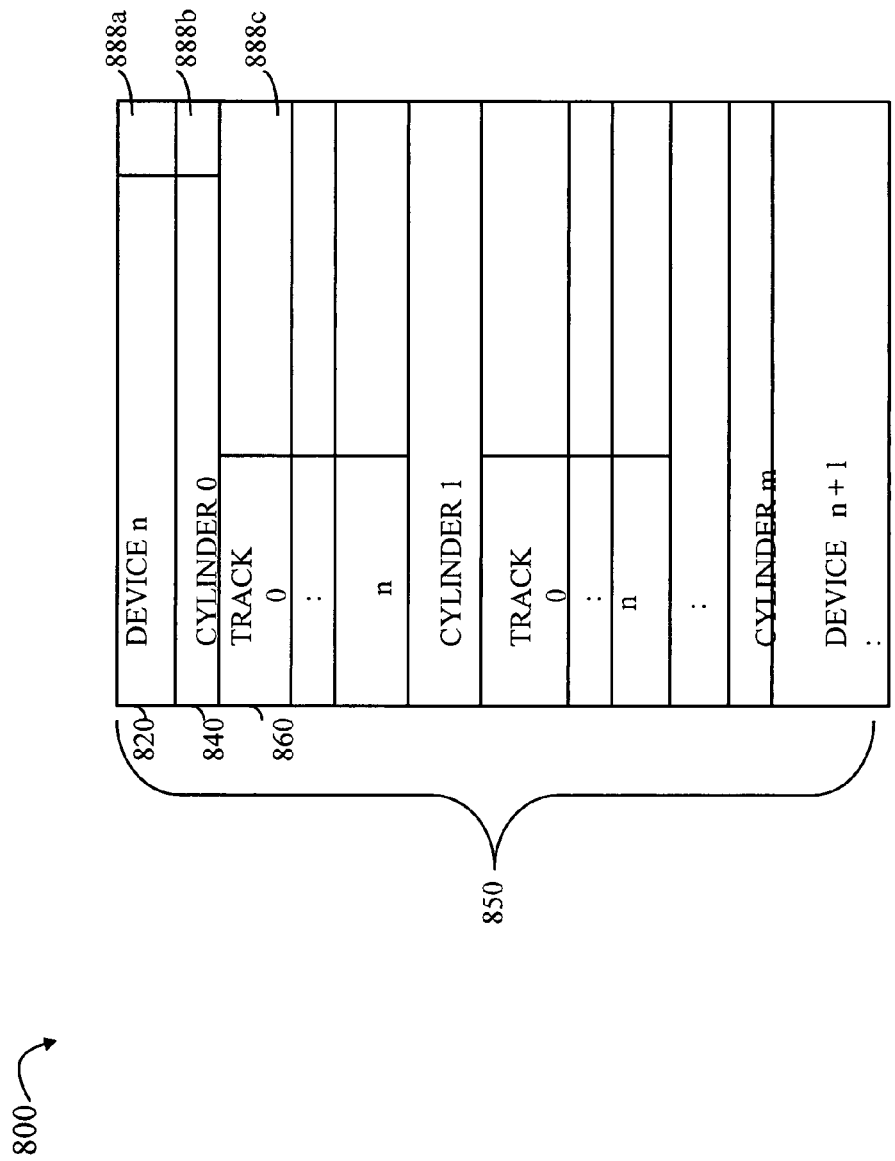
FIG. 11 is an example representation of a track id table.

Referring to FIG. 11, shown is an example of a representation of a track id table. The table 800 may be one of the tables included in the portion 204 of FIG. 4 for each logical device or LV. The table 800 may include a hierarchical structure relative to the structure of a disk, such as cylinders and tracks on a disk. Each device, such as device n, may have a corresponding portion 850. Each of the portions 850 for a device, such as an LV, may further be divided into sections in accordance with the disk structure. A portion 850 may include device header information 820, information for each cylinder 840 and for each track within each cylinder 860. For a device, a bit indicator 888a may indicate whether data associated with the device is stored in cache. The bit indicator 888b may further indicate for a particular cylinder within a device, is any data stored in the cache. Associated with each track may be a corresponding portion 888c indicating information about the particular data track. Portion 888c may include an invalid data bit value indicating whether a RAID group storing data for this particular track can provide a most recent copy of data for the track. In other words, the invalid data bit does not reflect the internal RAID group consistency but rather indicates whether the data provided by the RAID group for the track is the most recent copy of the data. The invalid bit may be set (e.g., to indicate that the RAID group cannot provide the most recent copy of the data) for a variety of different reasons. For example, a more recent copy of the data for this track may be provided on another data volume that is restored. As another example, processing may determine that the data for this track as stored in the RAID group is out of date due to a "lost" write operation such as data that had been stored in the cache and for some reason was never destaged to disk. Such a condition may be detected, for example, using a signature value for data in which the signature includes the write data operation. If the signature value is compared to another signature value for data stored on the RAID-6 devices (e.g., with no write operation applied), the signature values will differ and the lost write operation can be detected.

The invalid bit may be set, for example, by the application performing the restoration or otherwise detecting that the RAID-6 group has out of date data stored thereon. The invalid bit may be set to indicate that the data of the RAID-6 group needs to be updated. When the data of the RAID-6 group is updated, the invalid bit may be appropriately cleared to indicate that the RAID-6 group can provide a most recent copy of the data. The internal consistency of the RAID-6 group is reflected using a different technique and data portions in accordance with the consistency information as described elsewhere herein.

What will now be described is how the consistency data information described herein may be used in connection with utilizing a dynamic or hot spare device. A dynamic or hot spare device may be characterized as a secondary device which is used in the event that a primary device goes off line. The hot spare drive may not actually be used until the associated primary device fails. The hot spare drive may also be used in place of the primary device when the primary device exhibits signs of failing. In connection with the foregoing, the spare device may be introduced into the data storage system when a primary device exhibits signs of failing. Using the consistency bit map of FIG. 7, an additional bit may be allocated to represent the state of the spare device. The spare device may be indicated as an alias or mirror of the primary device initially in an inconsistent state.

Figure 12:
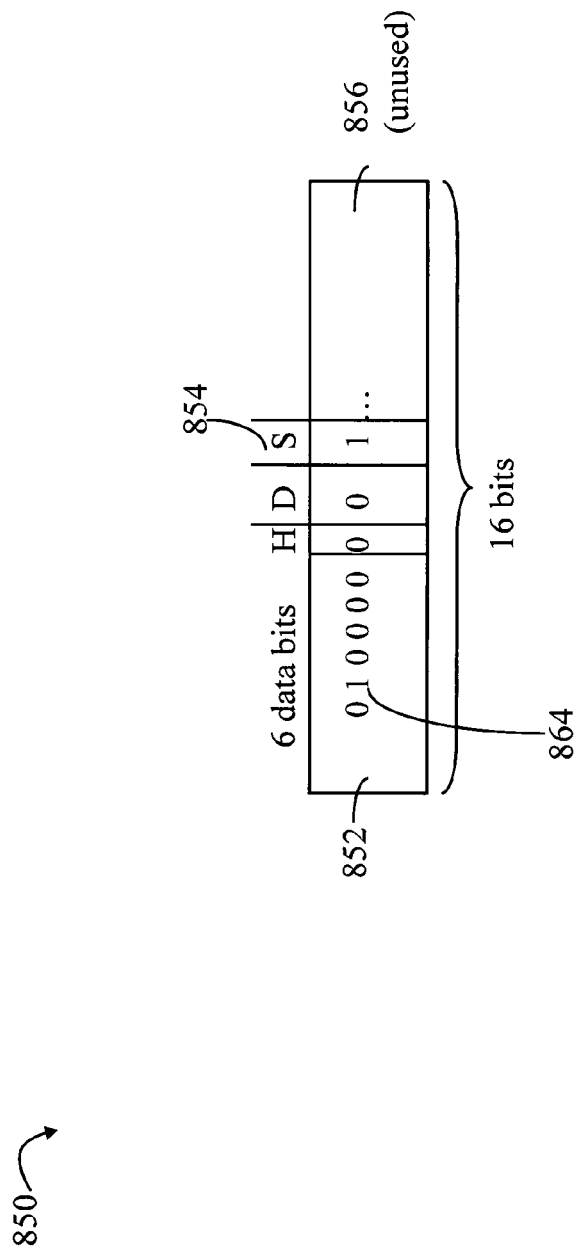
FIG. 12 is an example representation of consistency information in the form of a consistency bitmap for a slice of data modified for use with a spare device.

Referring to FIG. 12, shown is an example representation of consistency information for a slice modified to be used in connection with a spare drive. The consistency information 852 is a modified version with respect to the representation of FIG. 7 in that an additional $9^{th}$ bit as indicated by 854 is associated with the spare drive. The $9^{th}$ bit position may be initially set to 1 indicating that the spare drive is in an inconsistent state. Other information stored elsewhere describing the spare device may indicate that the spare drive is an alias or mirror of a designated one of the RAID group data member drives, such as an alias of member 1. As such, RAID data rebuilding or reconstruction techniques may be used to create a duplicate copy of the data from member 1 on the spare device. In other words, the RAID group data and/or parity members that are used to reconstruct or rebuild member 1 (e.g., so that member 1 is in a consistent state) are also used to duplicate data from member 1 on the spare device.

Using the foregoing techniques, the spare device may be introduced as a mirror of member 1 if member 1 shows signs of failure to migrate data from member 1 to the spare device using RAID rebuilding techniques. Once the spare device is in a consistent state, the failing member 1 may be brought offline and the spare device may be used in place of member 1 in the RAID group without waiting until member 1 fails. In the foregoing, the same parity information for member 1 is used for both data devices of member 1 and the spare device. When the failing member 1 drive is brought offline, the spare device may be introduced as a replacement for member 1. The additional $9^{th}$ bit may be introduced temporarily while both member 1 and the spare device are included. When the member 1 drive is subsequently brought offline, the spare device is used in place of member 1. An embodiment may then associate the bit position for member 1 864 with the spare device rather than continue to use the $9^{th}$ bit. Alternatively, an embodiment may continue to use the $9^{th}$ bit with the spare device and then later introduce a new or replacement member 1 drive associated with the member 1 bit position 864 and also swap out the spare device.

The foregoing may be used more generally as a technique for migrating data from one of the RAID group members to another device introduced as a spare device which mirrors one of the data members. The spare device may be temporarily introduced into the data storage system and associated with an extra bit in the consistency mapping information for each slice. The bit may be initially set to an inconsistent state for all slices stored on the data member being mirrored by the spare device. The RAID rebuild techniques may create a duplicate copy of the data member on the spare device. The spare device may then be used for other purposes once the rebuild completes duplicating the data on the spare device.

With reference back to FIGS. 4 and 5, the device header 202 may include an instance of the data 300 for each RAID group serving as a mirror. For example, one embodiment may allow up to 4-way mirroring. Each of the mirrors may be a RAID group having a corresponding instance of the data 300 of FIG. 5 in the device header 202. Information may be stored in the track id table indicating whether each track is mirrored. For example, with reference to FIG. 11, mirroring information may be stored in 888c for each track indicating a number of data mirrors. In one embodiment of the track id table, each track entry may have 4 bits used to indicate whether the track data is mirrored on up to 4 mirrors. Other techniques and representations may be used in an embodiment.

The techniques herein provide a hierarchical lookup when reading or retrieving RAID group consistency information using the hint bits. A first determination is made using the hint bits as to whether any one slice of a portion of slices is inconsistent. If so, a second determination may be made to obtain more detailed information regarding the slice since the hint bit may be set due to the slice in question as well as any other slice in the portion.

The foregoing provides a technique for encoding consistency information for each slice, such as each track. The consistency information may be used to encode consistency information for different RAID levels using the same structures. For example, the techniques herein may be used to encode consistency information for a RAID-1 implementation as well as a RAID-5 and RAID-6 implementation. The techniques herein encode the consistency information based on RAID group member count, not whether a member is data or parity information. Furthermore, whether the RAID group can provide a most recent copy of data may be indicated using an invalid bit in the track id table. The invalid bit may be used to indicate whether the RAID group data needs to be updated. The state regarding the internal consistency information for the RAID group is provided using other structures described herein.

It should be noted that although the techniques herein are illustrated for a logical device or volume (LV) and consistency information is stored per LV, consistency information stored using the techniques herein may be associated with a physical device and stored with tables, structures and the like per physical device. Other variations and extensions of the techniques herein will be appreciated by those skilled in the art.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for obtaining RAID group consistency information for a slice of data included on a device comprising:
    receiving a request for data stored in the slice;
    mapping the slice to an index, the index being one of a plurality of indices each associated with a structure indicating RAID group inconsistencies for a different portion of slices of data of the device;
    if the index is not associated with a structure, determining that there is no RAID group inconsistency for the slice;
    if the index is associated with a structure, performing:
        determining a hint bit associated with the slice, wherein the hint bit encodes summary consistency information for data and parity information for a plurality of slices, each of the plurality of slices including information stored on a plurality of different member devices of a RAID group, said hint bit being set if there is a RAID group inconsistency for information of any of the plurality of slices stored on any of the plurality of the different member devices;
        determining whether the hint bit is set; and
        if the hint bit is not set, determining that there is no RAID group inconsistency for any of the plurality of slices including the slice and servicing the request without performing a rebuild operation on a RAID group member device that stores the slice containing the data responsive to the request, and
        if the hint bit is set, performing processing to obtain additional slice-level RAID group consistency information of the structure for the slice to make a further determination as to whether the request is able to be serviced without performing a rebuild operation on a RAID group member device for the slice using at least some of the data and parity information.

2. The method of claim 1, further comprising:
    if the index is associated with said structure and if the hint bit is set, retrieving RAID group consistency information from the structure for the slice.

3. The method of claim 2, wherein said structure contains RAID group consistency information for a portion of slices forming a plurality of slice groups, each of said plurality of slice groups including a same number of slices from said portion.

4. The method of claim 3, wherein said retrieving further comprises:
    determining which first slice group of the plurality of slice groups includes said slice;
    determining an offset in said structure for said first slice group, said offset indicating where in said structure RAID group consistency information is stored for said first slice group;
    determining a location relative to said offset at which RAID group consistency information is stored for said slice; and
    retrieving RAID group consistency information for said slice from said location.

5. The method of claim 4, wherein said RAID group consistency information for said slice includes a bit associated with each member device of the RAID group.

6. The method of claim 5, wherein said each member device of the RAID group stores data or parity information.

7. The method of claim 5, wherein a bit associated with said each member device of the RAID group is set if said each member device contains inconsistent data for said slice.

8. The method of claim 1, wherein said structure is stored in a cache slot.

9. The method of claim 1, wherein prior to receiving the request, the device is subject to a rebuild operation as a result of failure of at least one RAID group member device.

10. A method for updating RAID group consistency information for a slice of data included on a device comprising:
    mapping the slice to an index, the index being one of a plurality of indices each associated with a different portion of slices of data of the device;
    determining whether the index is associated with a structure;
    if the index is not associated with said structure, allocating storage for the structure and associating the structure with the index, said structure indicating RAID group inconsistencies for a first portion of slices of data of the device, the first portion including the slice;
    determining a location in said structure at which RAID group consistency information for said slice is stored;
    determining a value for a hint bit encoding summary consistency information for data and parity information of a plurality of slices including said slice, said hint bit being set if there is a RAID group inconsistency for any of the plurality of slices, said structure including a plurality of entries of RAID group consistency information, each of said plurality of entries including RAID group consistency information for a corresponding one of said plurality of slices, each of said plurality of entries comprising a plurality of bits, each of said plurality of bits being associated with a different member device of a RAID group, said hint bit being set when any of the plurality of bits in any of the plurality entries indicates a RAID group inconsistency;
  receiving a request for data stored in the slice;
  determining whether the hint bit is set;
  if the hint bit is not set, determining that there is no RAID group inconsistency for any of the plurality of slices including the slice and servicing the request without performing a rebuild operation on a RAID group member device that stores the slice containing the data responsive to the request; and
  if the hint bit is set, performing processing to obtain additional slice-level RAID group consistency information of the structure for the slice to make a further determination as to whether the request is able to be serviced without performing a rebuild operation on a RAID group member device for the slice using at least some of the data and parity information.

11. The method of claim 10, further comprising:
  determining one or more hint bits encoding summary consistency information for the first portion of slices; and
  determining whether the one or more hint bits indicate that there are no inconsistencies for the first portion of slices.

12. The method of claim 10, wherein, if the one or more hint bits indicate that there are no inconsistencies, the method further comprising deallocating storage for the structure.

13. The method of claim 12, wherein said deallocating storage for the structure includes returning a cache slot including said structure to a cache pool.

14. The method of claim 10, wherein said allocating storage for said structure includes obtaining a cache slot used to store said structure.

15. The method of claim 10, wherein prior to receiving the request, the device is subject to a rebuild operation as a result of failure of at least one RAID group member device.

16. A computer readable memory comprising code stored thereon for obtaining RAID group consistency information for a slice of data included on a device, the computer readable medium comprising code for:
  receiving a request for data stored in the slice;
  mapping the slice to an index, the index being one of a plurality of indices each associated with a structure indicating RAID group inconsistencies for a different portion of slices of data of the device;
  if the index is not associated with a structure, determining that there is no RAID group inconsistency for the slice;
  if the index is associated with a structure, performing:
    determining a hint bit associated with the slice, wherein the hint bit encodes summary consistency information for data and parity information for a plurality of slices, each of the plurality of slices including information stored on a plurality of different member devices of a RAID group, said hint bit being set if there is a RAID group inconsistency for information of any of the plurality of slices stored on any of the plurality of the different member devices;
    determining whether the hint bit is set;
    if the hint bit is not set, determining that there is no RAID group inconsistency for any of the plurality of slices including the slice and servicing the request without performing a rebuild operation on a RAID group member device that stores the slice containing the data responsive to the request, and
    if the hint bit is set, performing processing to obtain additional slice-level RAID group consistency information of the structure for the slice to make a further determination as to whether the request is able to be serviced without performing a rebuild operation on a RAID group member device for the slice using at least some of the data and parity information.

17. The computer readable memory of claim 16, further comprising code for retrieving RAID group consistency information from the structure for the slice if the index is associated with said structure and if the hint bit is set.

18. The computer readable memory of claim 17, wherein said structure, contains RAID group consistency information for a portion of slices forming a plurality of slice groups, each of said plurality of slice groups including a same number of slices from said portion.

19. The computer readable memory of claim 18, wherein said code for retrieving further comprises code for:
  determining which first slice group of the plurality of slice groups includes said slice;
  determining an offset in said structure for said first slice group, said offset indicating wherein said structure RAID group consistency information is stored for said first slice group;
  determining a location relative to said offset at which RAID group consistency information is stored for said slice; and
  retrieving RAID group consistency information for said slice from said location.

20. The computer readable memory of claim 16, wherein said structure is stored in a cache slot.

21. The computer readable memory of claim 16, wherein prior to receiving the request, the device is subject to a rebuild operation as a result of failure of at least one RAID group member device.

* * * * *